United States Patent [19]
Andres et al.

[11] Patent Number: 5,749,194
[45] Date of Patent: May 12, 1998

[54] SERVICE BOARD FOR MOUNTING SERVICES TO BASE MATERIAL

[76] Inventors: James J. Andres, 8120 Miles Rd., East Amherst, N.Y. 14051; Ladd M. Kline, 18 Madaline La., Depew, N.Y. 14043

[21] Appl. No.: 802,551

[22] Filed: Jan. 11, 1997

[51] Int. Cl.[6] ............................................. E41C 1/40
[52] U.S. Cl. .................... 52/506.06; 52/507; 52/511; 174/48; 211/87.01; 312/245
[58] Field of Search ................... 52/506.01, 506.06, 52/507, 510, 511, 512; 174/48; 312/245; 211/87.01

[56] References Cited

U.S. PATENT DOCUMENTS

| 2,942,364 | 6/1960 | Horton | 211/81.01 X |
| 3,497,079 | 2/1970 | Kulwiec | 211/87.01 |
| 4,730,424 | 3/1988 | Green et al. | 211/87.01 X |

*Primary Examiner*—Christopher Kent

[57] ABSTRACT

An apparatus for affixing services to a base material including: a service board with a front surface and a back surface, a plurality of standoffs, and a plurality of fastening holes passing through the front surface and back surface of the service board.

3 Claims, 8 Drawing Sheets

SERVICE BOARD FOR MOUNTING SERVICES TO BASE MATERIAL

FIELD OF THE INVENTION

The present invention relates to a new and unique service board for purposes of standardizing and centralizing the mounting of all services to one location within a building or structure, including a load center and electrical utility boxes associated therewith, telephone service, and cable television service (hereinafter referred to at times collectively as "services").

BACKGROUND OF THE INVENTION

Currently, load centers are affixed to a building base material by building a service board from plywood and 2×4s or other sized or shaped pieces of wood. Generally, the load center installer (hereinafter, the installer of any services will be referred to as "technician") on a job site gathers remaining scrap wood from the building or purchases wood to construct a rudimentary service board. The service board is then affixed to the base material, such as a basement wall, floor joist, or wall stud, and the load center is attached thereto.

By necessity, the main service entrance cable and ground wire extends into a load center from outside of the building. Furthermore, a number of sub feed wires extend from the load center to various outlets, lights, and appliances. The National Electrical Code (hereinafter referred to as "NEC") requires that such cables and wires be secured within 12 inches of the load center. The standard means for securing such cables and wires within 12 inches of the load center is to hammer metal staples around each cable and wire and into the constructed service board which is affixed to the base material.

Problems consistently associated with the use of wood, scrap wood or otherwise, and metal staples are many. In particular, wood is a flammable material and naturally absorbs and holds moisture in areas such as building basements. When utilizing the standard technique for securing cables and wires to the wood service board; that is, with staples, technicians generally pound them in with hammers or other blunt instruments. Such practice significantly increases the likelihood of causing damage to the protective coating material contained on the cables and wires and exposing the current carrying ("hot") wires therewithin. In addition, such pounding of staples into the service board increases the risk of loosening circuit breakers, other services, wires associated with such services and breakers, other staples, and threatens the stability of the service board as it is affixed to the base material. Moreover, throughout the life of a load center, cables and wires must be removed for replacement when damaged or for the replacement or addition of other services. In such events, the staples are generally pried off using the back end of a hammer or other pry worthy instruments. Such prying, again, increases the risk of destroying the protective coating on the surface of such cables and wires and loosening the foregoing services, wires, and service board. The potential damage consequent to exposure of hot wires is compounded by moisture naturally absorbed by a wooden service board; such absorption of water enhances the conductivity of that wooden service board.

In addition, by gathering scrap wood from the job site to construct an appropriate service board to affix the services to the base material, a technician is restricted by the size, quality, and shape of various pieces of scrap wood. Many times, with the efficiency in home building, suitable mounting scrap wood is limited. Technicians, therefore, are often compelled to utilize smaller pieces of wood to construct the service board. Such smaller pieces of wood rarely provide sufficient room to securely affix the cables and wires or other services thereto. Hence, to comply with NEC requirements of securing cables and wires within twelve inches from the load center, technicians must affix the constructed service board to the base material near the floor joist, where cables and wires may then be secured. This presents difficulties in maneuverability for the technician and results in increasing risks of damage to the wires and services, as well as injury to the technician.

Additionally, it is standard practice to bring all other services into the same area from the exterior of the building as the main service entrance cable and ground wire. Each service cable and wire is brought in by a separate and independent technician. For example, while one technician carries out the task of installing the electrical service, a separate technician is utilized to install the telephone service, with a third technician to install the cable television service, and a fourth technician to install other services. The separate technicians, while bringing their respective services in through the same entry point, affix their respective services in a disorganized manner wherever space allows in the building. The result is a disorganized grouping of services, each having several associated wires and extending to various points throughout a region of a building or structure.

Furthermore, the standard means utilized by a technician to construct a service board and affix the load center to the base material, provides little or no direct access behind the service board. It is often necessary to run cables and wires from the exterior and interior of the building, to and behind the service board for purpose of attaching such cables and wires to an available position on the load center. It is then difficult to maneuver the cables and wires behind the service board since access to that region from the side areas of the service board is blocked by wooden structure. In addition, a standard service board does not provide an adequate view of the space between the mounting surface and base material during manipulation of cables and wires therethrough. Thus, the cable or wire is fed behind the service board in a blind manner. A blind feed can be hazardous to the technician causing risk of hand injuries and damaged wires by blindly and inadvertently scraping hands and/or wires on screw or staple points that have passed through to the back surface of the service board.

In addition, in situations where the technician is compelled to mount the service board to the floor joist as a result of the inadequate size of the scrap wood, it is often the case that technicians may only conveniently secure the top portion of the service board, leaving the bottom portion relatively unsecured. The practice of only securing the top portion of a service board to the base material is not only unsafe, but it is a violation of the NEC.

Finally, the standard method of affixing load centers to a base material does not provide a sufficient spacing from said base material for consistency with the walls of a finished off basement.

SUMMARY OF THE INVENTION

The present invention is comprised, generally, of a service board of a non-wooden material, having a multiplicity of fastening holes spaced appropriately to tie off and adequately secure any size cable or wire directly to the service board within twelve inches of the load center, as well as to secure any other service cable or wires extending to or from other services. Furthermore, the fastening holes are strategically located to provide surface space sufficient to affix all of the foregoing services to one service board in an organized fashion. Moreover, the center portion of the service board is free of fastening holes and that region is sized appropriately to enable the adequate securing of a load center of any size between 100 amps and 225 amps; currently an excess of 80 separate size load centers fit within that range.

The service board further consists of standoffs to provide a four inch separation between the back surface of the service board and the base material. This separation provides easy access for hands and tools, as well as a clear view, between the service board and base material for the proper manipulation or feeding and securing of cables and wires. Moreover, the four inch spacing from said base material as provided by standoffs facilitates consistency between the service board and walls of a finished off basement. Further, the four inch spacing enables the fastening holes to be conveniently used for fastening cables and wires with cable ties to the back surface of the service board.

Additionally, the service board is comprised of a gridwork of molded ribs on its back surface to provide sufficient support to enable the thickness of the service board to be reduced from one half inch to one eighth inch. This reduction decreases the associated weight of the service board for ease in hanging or otherwise affixing to a base material while maintaining structural integrity. Further, the reduction in service board thickness enables more cost efficient production of service boards.

The present invention further comprises a hanging template for ease of marking, drilling, and placement of the necessary mounting anchors and/or screws, prior to affixing the service board to the base material.

It is therefore an object of the present invention to provide a service board made of non-flammable, non-conductive, and moisture resistant material.

It is a further object of the present invention to provide a service board capable of organizing all services and utility devices utilized in a building or structure in one location.

It is a further object of the present invention to provide a means of securing and removing all cables and wires in a manner consistent with the NEC requirements and in a manner which significantly reduces the risk of damaging the protective coating of cables and wires, exposing hot wires to the environment, and loosening the circuit breakers, other services, and the stable affixment of the service board to the base material.

It is a further object of the present invention to provide a service board with standoffs to create sufficient space between the back surface of the service board and the base material to maintain a consistent, smooth connection surface between the service board and the walls of a finished off basement.

It is a further object of the present invention to provide a service board having standoffs for consistent and stable securing of the top, middle, and bottom portions of the service board to a base material.

It is a further object of the present invention to provide a service board with easy access for hands and tools to the region between the service board and base material, as well as an unobstructed view of the space between the back surface of the service board while feeding wire or cable therethrough.

It is a further object of the present invention to provide a service board with easy workability for technicians on the front surface of the board which reduces risk of hazards to the technicians.

It is a further object of the present invention to provide a service board on which cables and wires may be secured without staples.

It is a further object of the present invention to provide a light weight, cost efficient service board for ease in affixing services and utility devices to a base material while at the same time providing a service board with sufficient structural support to adequately secure such services and devices thereon.

It is a further object of the present invention to provide a service board which will facilitate the standardization and centralization of the mounting process to ensure proper installation of services and electrical devices.

It is a further object of the present invention to provide a template to facilitate ease in affixing the service board to a base material.

In addition, it is an object of the present invention to provide a service board with versatility sufficient to enable to mounting of a security control panel in place of the load center, while maintaining all of the foregoing features and benefits.

DETAILED DESCRIPTION OF THE PREFERRED EMBODIMENTS

Figure 1:
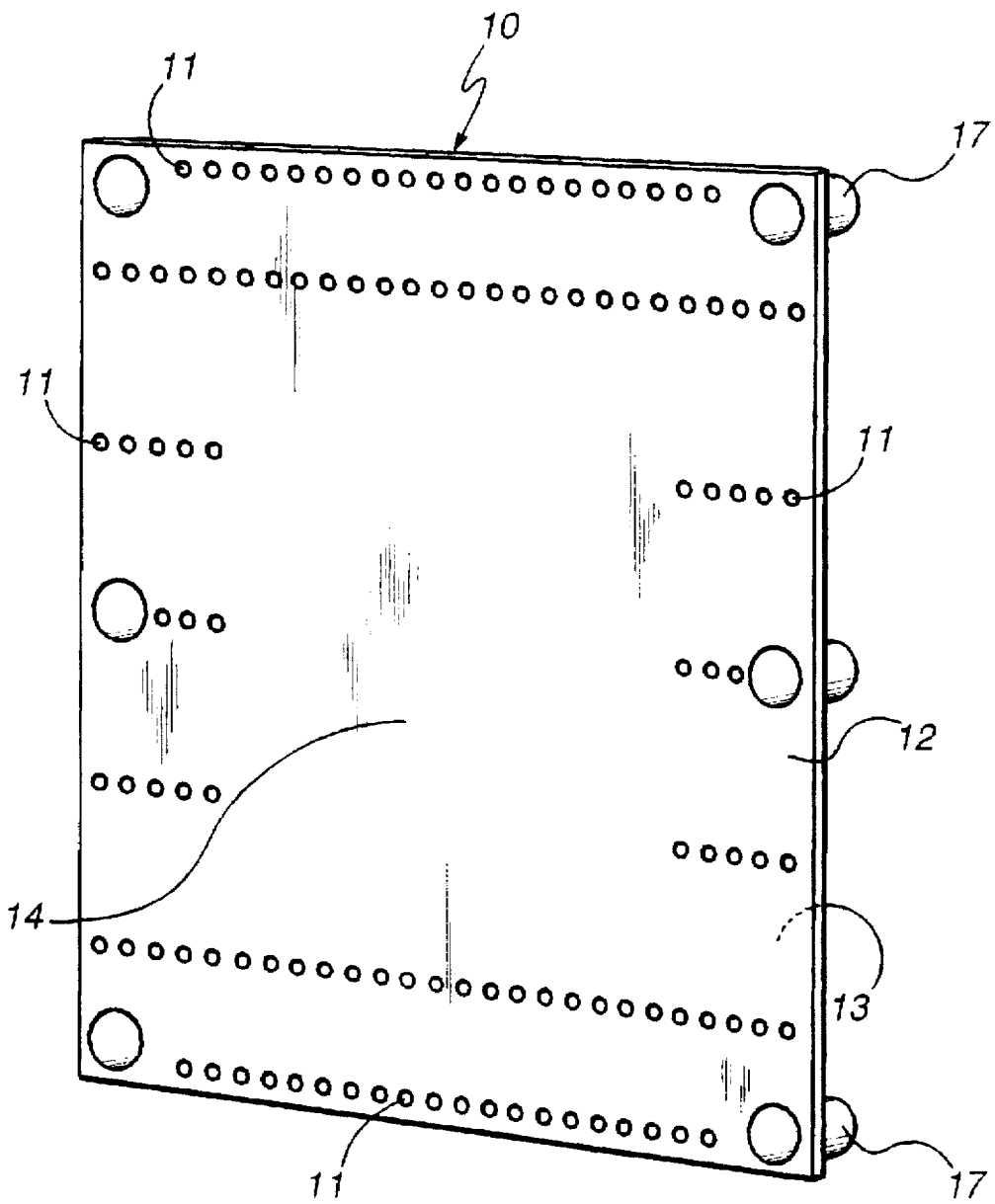
FIG. 1 is a front, slightly angled view of the service board.

As shown in FIG. 1, service board 10, preferably comprised of sheet molding compound, contains a plurality of fastening holes 11 passing through the front surface 12 and back surface 13 of service board 10. Fastening holes 11 are preferably spaced across each row by one inch, center to center, and preferably spaced down each column by five to eight inches, center to center. The center region 14 of service board 10 does not contain fastening holes 11 and is of sufficient size to provide a solid surface to enable a load center or security control panel to be affixed securely in a center position of service board 10.

Figure 2:
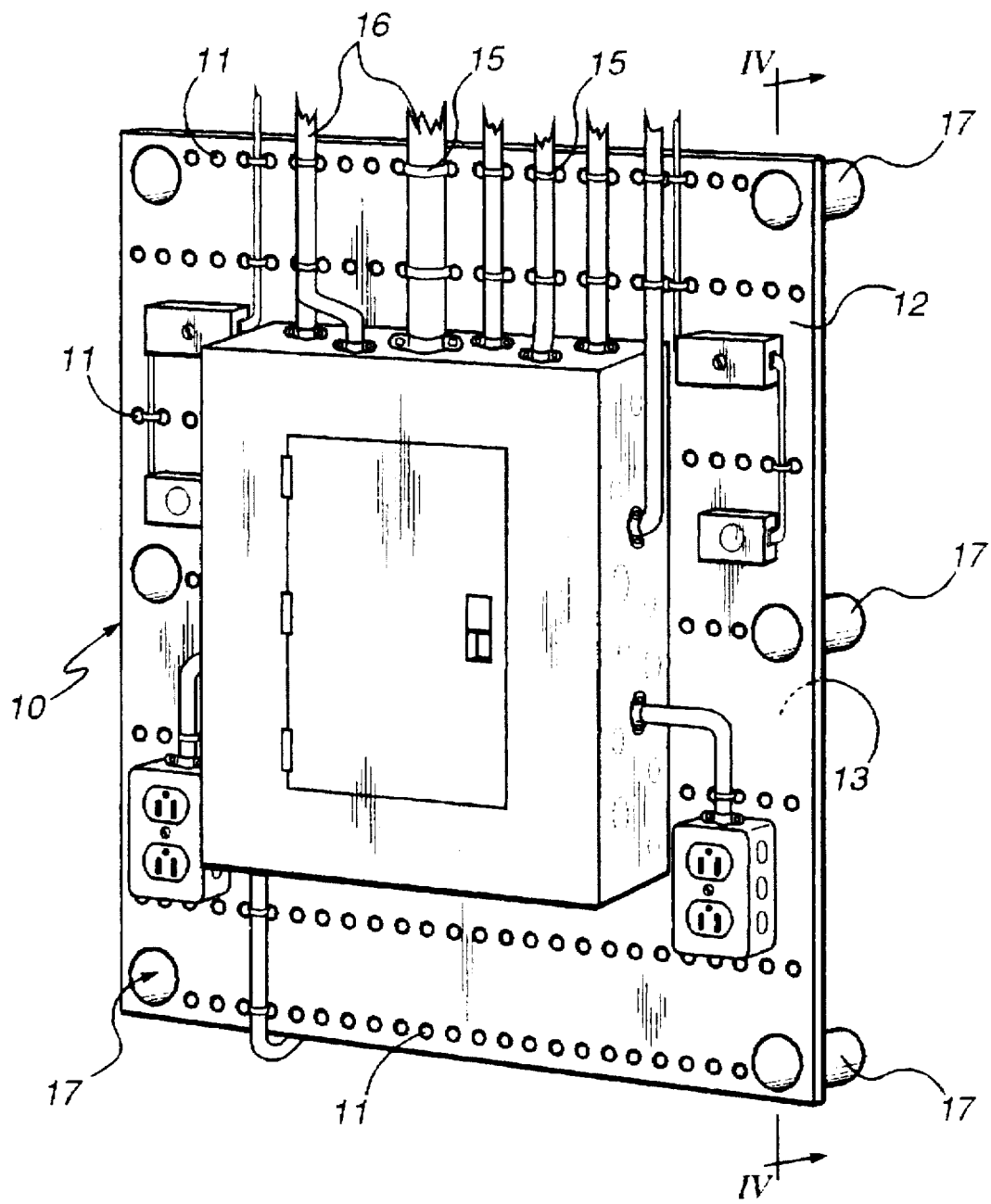
FIG. 2 is a front, slightly angled view of the service board with services attached thereto.

As shown in FIG. 2, the fastening holes 11 serve to eliminate the need for the use of staples as a securing means for cables and wires. Furthermore, cable ties 15, preferably plastic or nylon, are used in place of staples by passing cable ties 15 through fastening holes 11 from back surface 13 to front surface 12 of service board 10 and around cables and wires 16. Fastening holes 11 are strategically placed to enable the securing of cables and wires of varying sizes.

As shown further in FIG. 2, fastening holes 11 are spaced five to eight inches down each column to enable the secure fastening of services and electrical devices on a solid surface therebetween.

As shown in FIGS. 1, 2, 3, 4, 4a, and 5 service board 10 is further comprised of standoffs 17. As shown particularly in FIG. 3, standoffs 17 are cup shaped with an inner surface and an outer surface defining a hollow center 17a.

Figure 4:
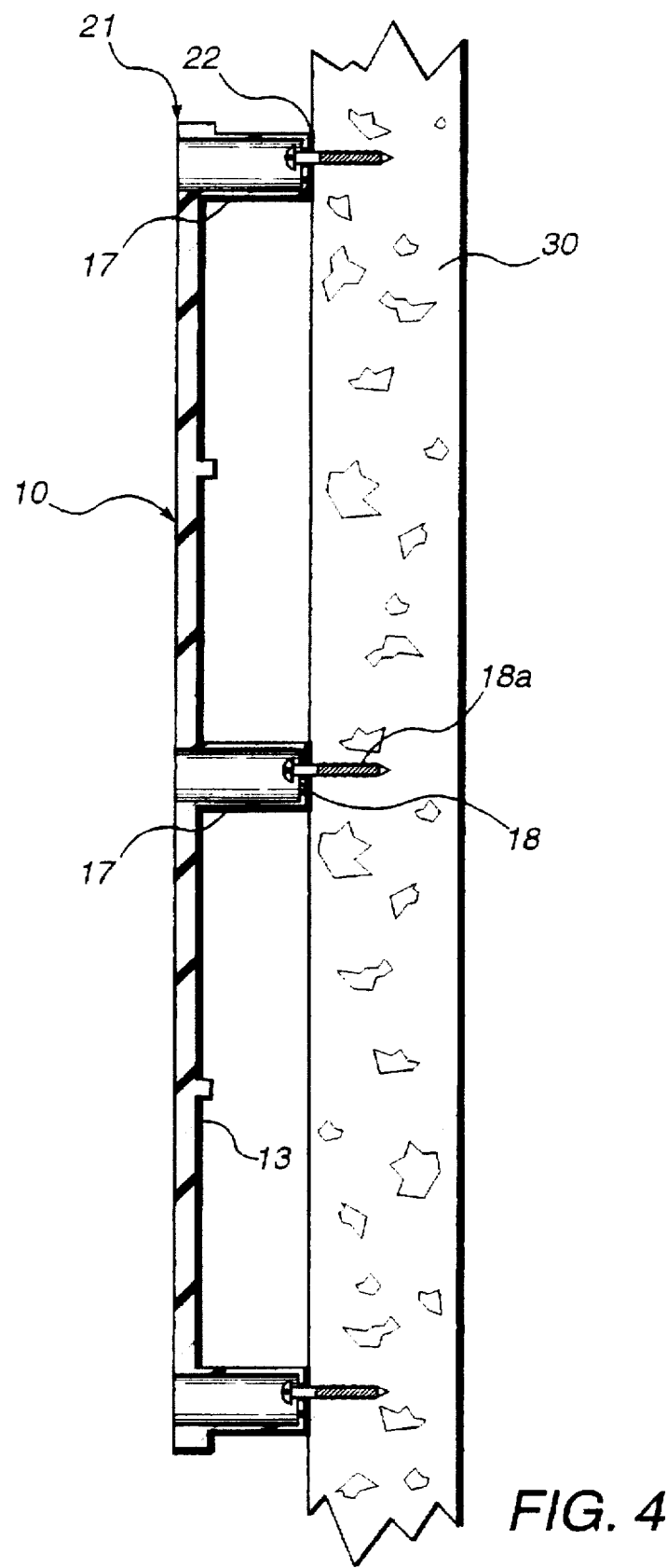
FIG. 4 is a side view of the service board mounted on a concrete or block base material.

As shown particularly in FIG. 4, a first side 21 is open through service board 10 and a second side 22 is comprised of a substantially closed flat surface.

Figure 3:
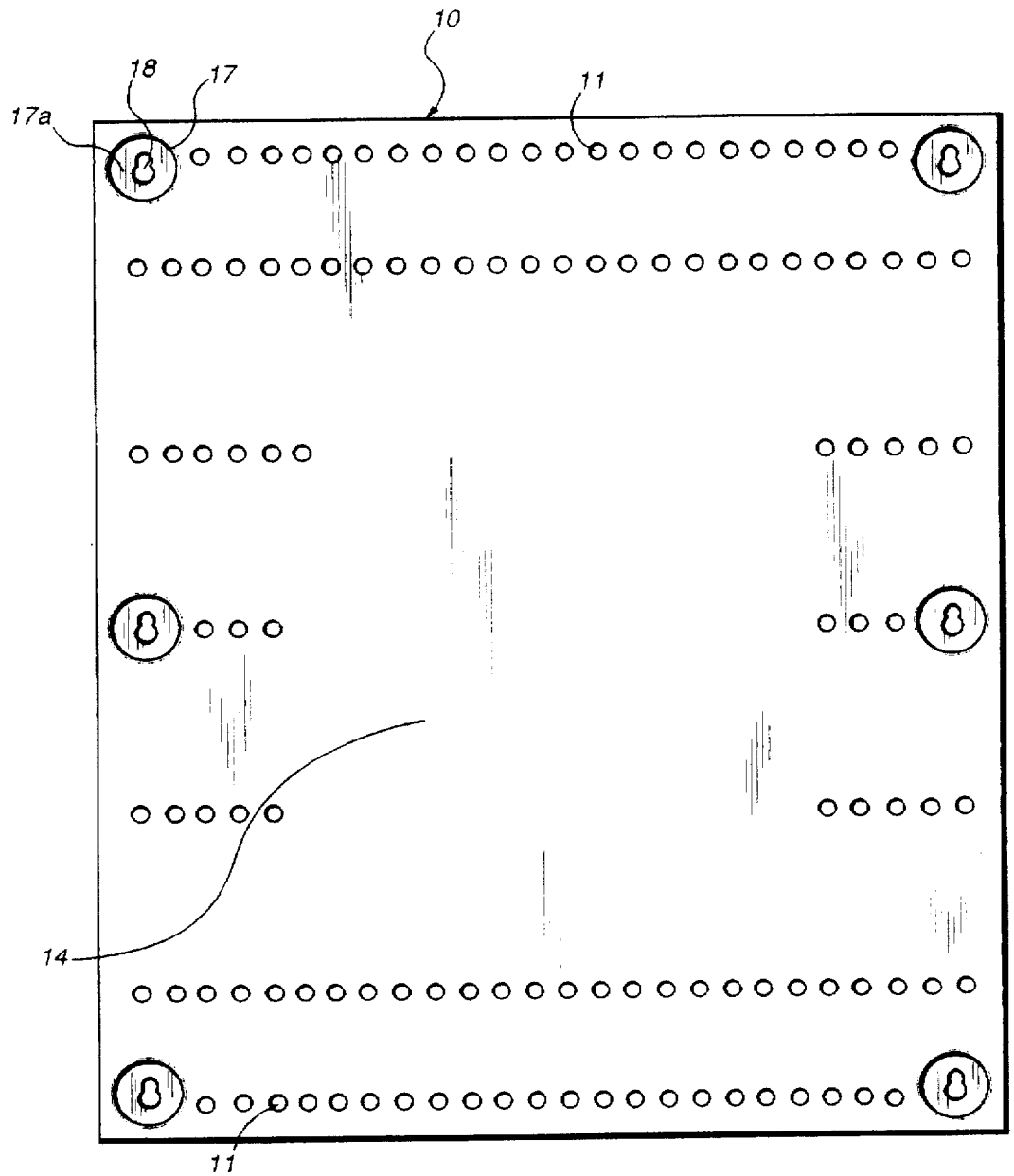
FIG. 3 is a front view of the service board.

As shown further in FIGS. 3 and 4, second side 22 is further comprised of a teardrop shaped mounting hole 18 and a sufficient opening diameter at first side 21, preferably four inches, to enable easy access for hands and tools therewithin. Service board 10 is preferably comprised of six standoffs 17, three spaced evenly on each side, to enable securing to base material at three substantially evenly spaced points on each side. Such substantially even spacing is important to provide adequate structural support in the middle area 14 of service board 10; the middle area 14, where a substantial portion of the weight of services affixed to service board 10 is focused. In particular, the middle area houses the load center or security control panel, depending upon the desired application.

Figure 4A:
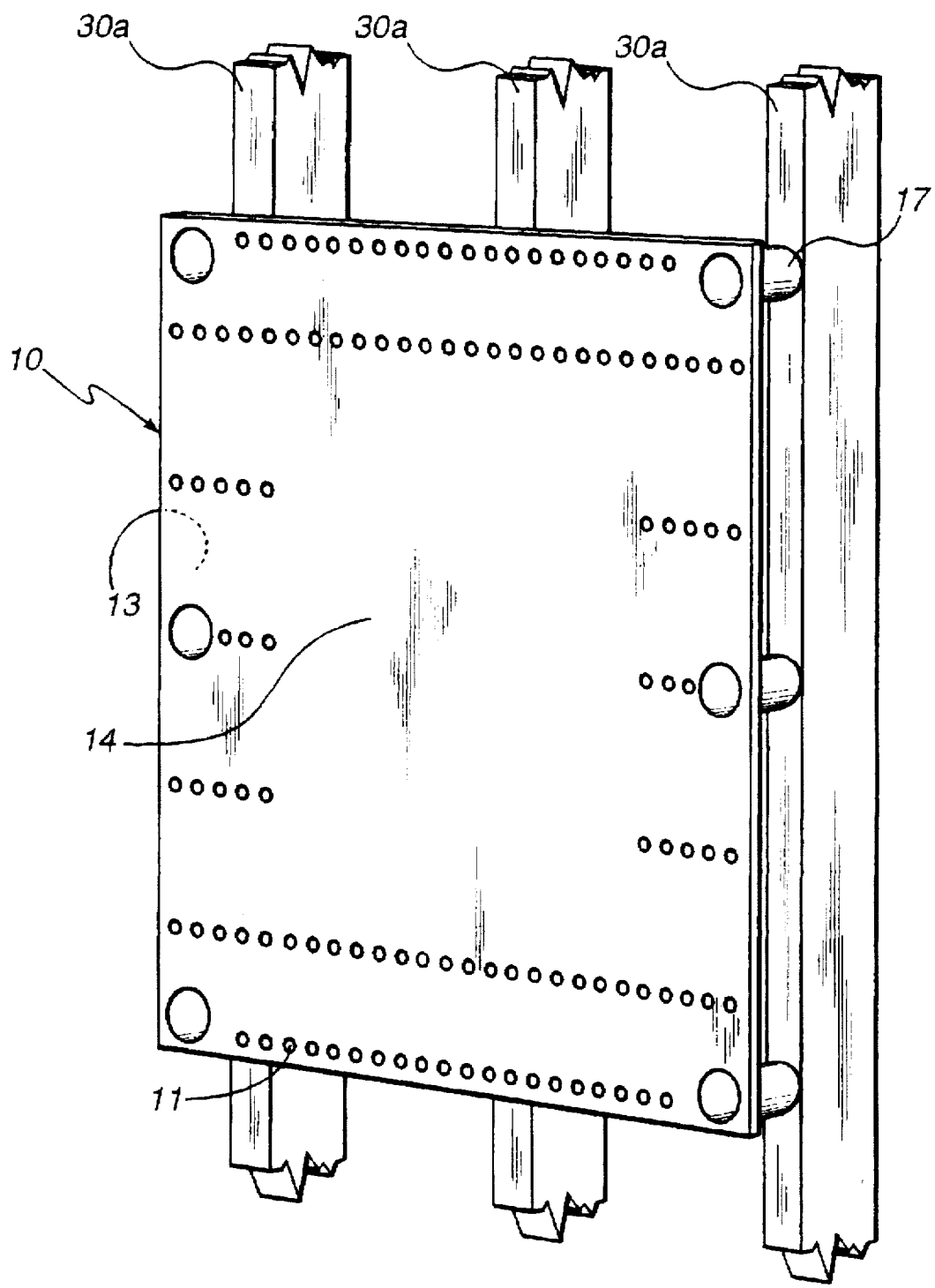
FIG. 4a is a front, slightly angled view of the service board mounted on wall studs.

As shown particularly in FIG. 4 and 4a, standoffs 17 are of sufficient length, preferably four inches, to enable easy access for hands and tools, as well as a clear view, behind service board 10 after service board 10 is affixed to base material 30 and 30a. Furthermore, as shown in FIG. 4, the four inch length provides a sufficient separation between the back surface 13 and base material 30 for consistency between the service board 10 and the walls of a finished off basement.

As shown further in FIGS. 4 and 4a, standoffs 17 are comprised of a flat bottom surface 22 for compatibility with base material, either concrete 30, or wood 30a, or other flat material, and coupled with teardrop shaped mounting holes 18 to facilitate ease in hanging on mounting screws 18a.

As shown further in FIG. 3, teardrop shaped mounting holes 18 of standoffs 17 are preferably spaced across the width of service board 10 by a distance of either 16 or 32 inches consistent with spacing of standard wall studs. To facilitate such spacing, service board 10 is preferably 37 inches wide. Additionally, service board 10 is preferably between 24–60 inches in length depending upon the services to be affixed thereto.

Figure 5:
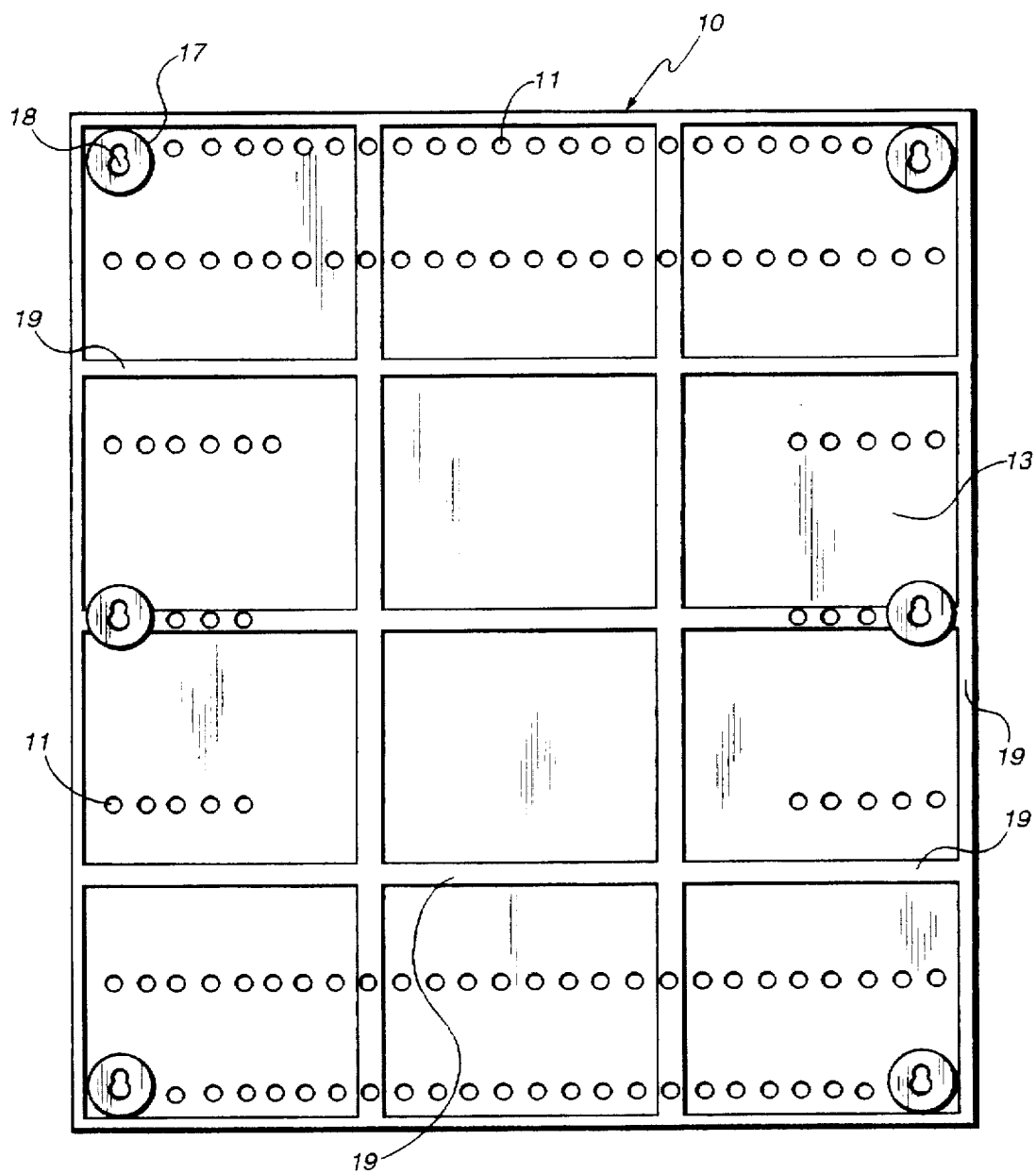
FIG. 5 is a rear view of the service board showing the back surface and support ribs.

As shown in FIG. 5, back surface 13 of service board 10 is comprised of a gridlock of molded support ribs 19 for structural support. Such support ribbing 19 enables service board 10 to be of relatively thinner depth, preferably one-eighth inch, while maintaining the structural integrity of a board with thicker depth, such as one-half inch. Support ribs 19 are preferably in a grid like design and having a depth of preferably one half inch.

Service board 10 is manufactured as one piece by compression molding and is comprised of preferably, Premi-Glas® 2205-22 CR/SX sheet molding compound (SMC), manufactured by Premix, Inc.

Figure 6:
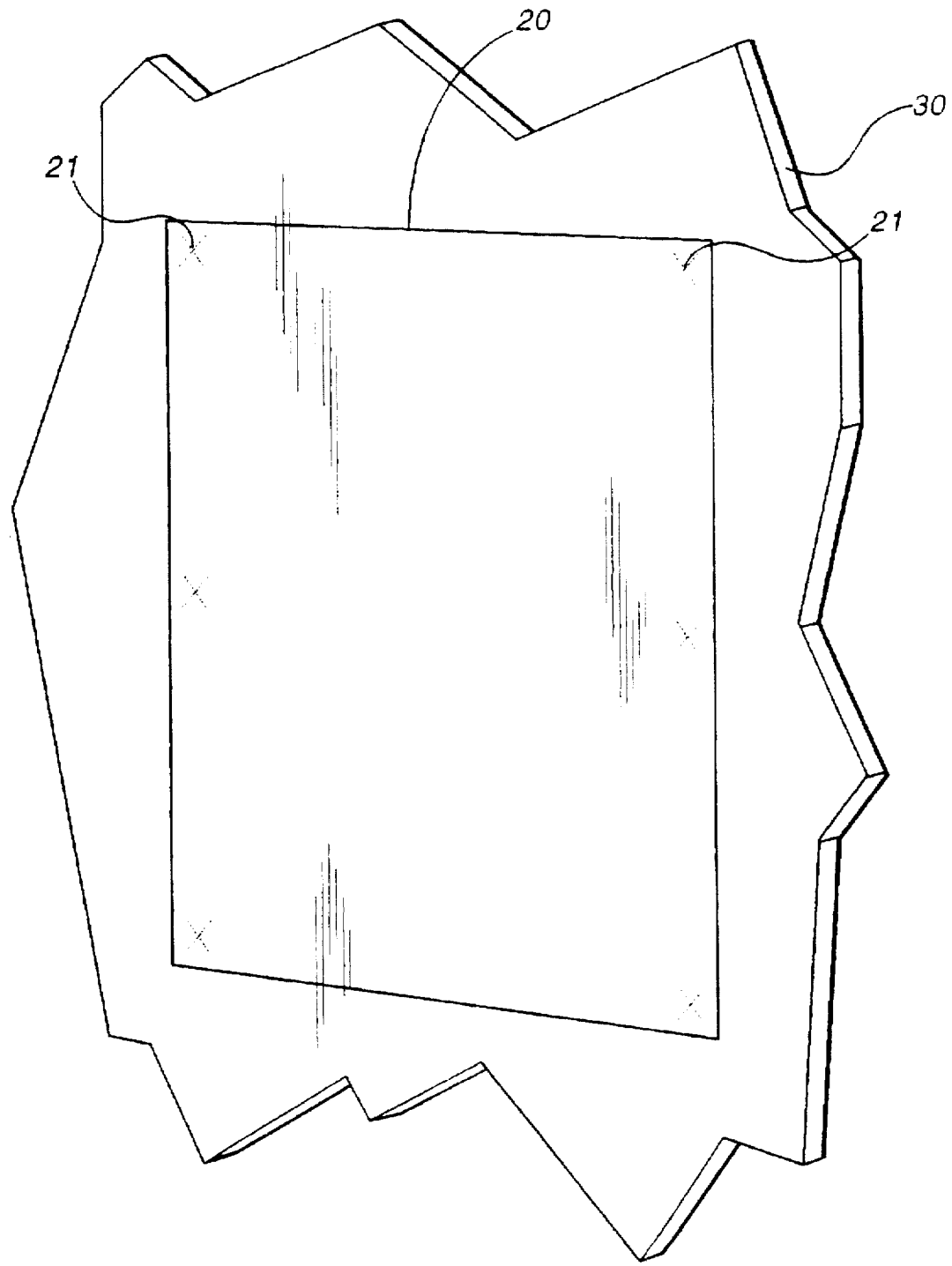
FIG. 6 is a front view of the template.
Figure 6A:
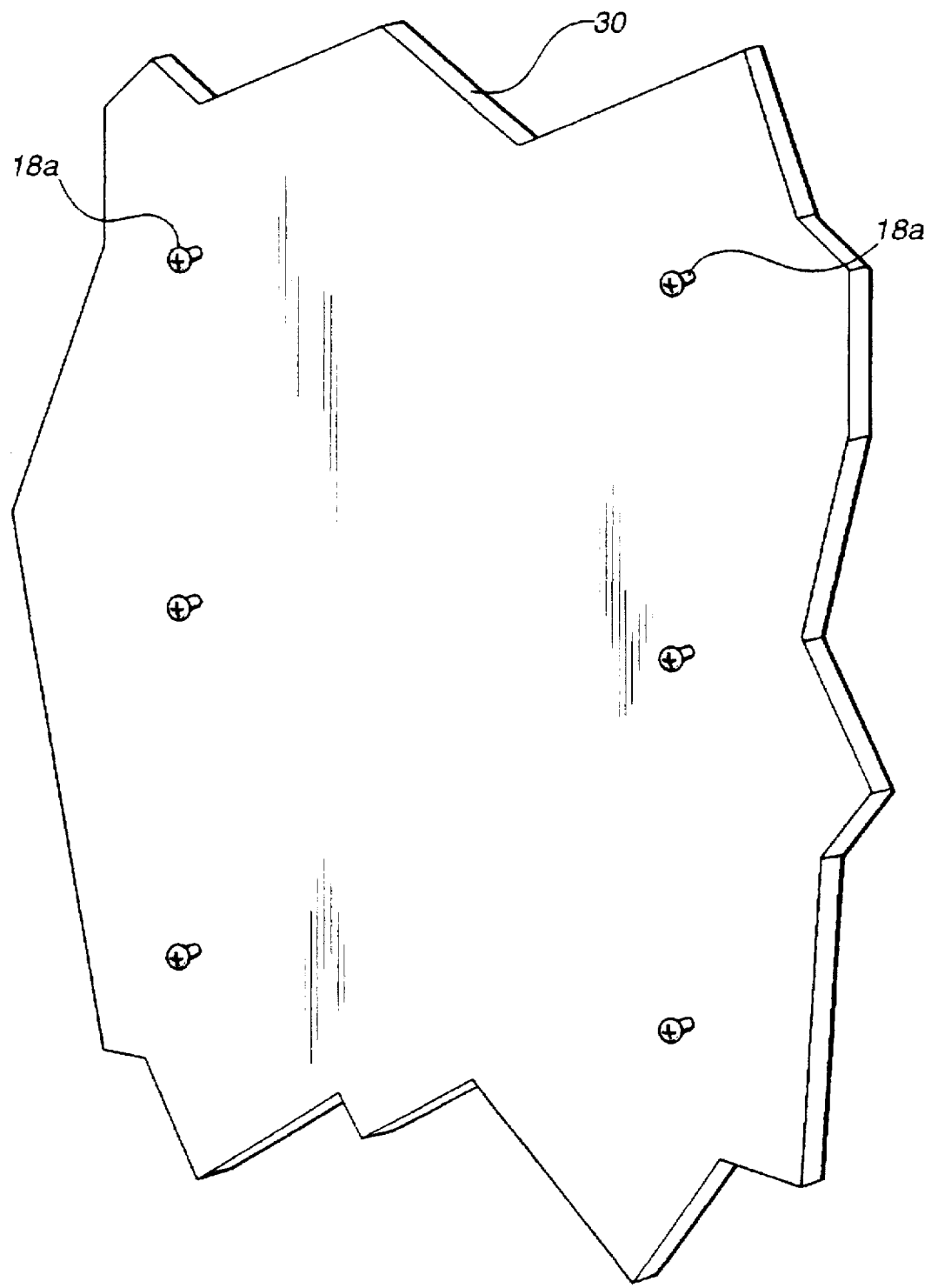
FIG. 6a is a front view of mounting screws in a base material.

As shown in FIG. 6, the present apparatus further comprises a template 20 to facilitate presetting of mounting anchors when necessary (generally mounting anchors are necessary when the base material is comprised of concrete or block) and/or screws to base material 30 for purpose of ease in securing service board 10 to said base material 30. Template 20 is comprised of six marking holes 21, preferably in the shape of an X, in positions consistent with mounting holes 18 of service board 10. Procedurally, template 20 is preliminary placed in mounting position on base material 30 for the purpose of marking points on base material 30. Mounting positions on base material 30 are then marked through marking holes 21. Template 20 is then removed leaving markings on base material 30. Holes are drilled in base material 30 through markings. If base material is concrete or block 30, mounting anchors are placed within drilled holes prior to placement of screws. As shown in FIG. 6a, mounting screws 18a are then placed within said holes for mounting of service board 10.

As shown in FIGS. 4 and 6a, service board 10 is then mounted on said mounting screws 18a through mounting holes 18.

Although the invention has been described in detail for the purpose of illustration, it is to be understood that such detail is solely for that purpose and that variations can be made by those skilled in the art without departing from the spirit and scope of the invention except as it may be limited by the claims.

What is claimed is:

1. An apparatus for affixing services to a base material comprising:

a service board having a front surface and a back surface, a plurality of standoffs, and a plurality of fastening holes passing through said front surface and back surface of said service board;

said standoffs are cup-shaped and extending outward from said back surface of said service board.

2. An apparatus for affixing services to a base material comprising:

a service board having a front surface and a back surface, a plurality of standoffs, and a plurality of fastening holes passing through said front surface and back surface of said service board;

said standoffs are comprised of an inner surface and an outer surface; said inner surface defining a hollow portion;

said standoffs each having an open end and a substantially closed end;

said closed end having a mounting hole.

3. An apparatus according to claim 2 wherein said mounting hole is in the shape of a teardrop.

* * * * *